United States Patent [19]

Marian

[11] Patent Number: 4,962,522

[45] Date of Patent: Oct. 9, 1990

[54] ELECTRONIC CONTROLLER FOR SPRINKLER SYSTEMS

[76] Inventor: Michael B. Marian, 152 Bahama Reef, Novato, Calif. 94946

[21] Appl. No.: 129,128

[22] Filed: Dec. 4, 1987

[51] Int. Cl.$^5$ ............................................. A01G 27/00
[52] U.S. Cl. ........................................ 379/5; 379/105; 239/70; 340/825.44; 340/311.1
[58] Field of Search ................. 379/57, 105, 102, 105; 340/825.44, 825.45, 825.07, 825.08, 311.1, 313; 239/70

[56] References Cited

U.S. PATENT DOCUMENTS

| | | | |
|---|---|---|---|
| 3,114,243 | 12/1963 | Winters | 61/12 |
| 3,372,899 | 3/1968 | McPherson | 251/26 |
| 3,653,595 | 4/1972 | Greenard, Jr. et al. | 239/70 |
| 3,726,477 | 4/1973 | Shapiro | 239/70 |
| 4,146,049 | 3/1979 | Kruse et al. | 239/344 |
| 4,185,650 | 1/1980 | Neves et al. | 137/15 |
| 4,208,630 | 6/1980 | Martinez | 375/1 |
| 4,209,131 | 6/1980 | Barash et al. | 239/68 |
| 4,396,149 | 8/1983 | Hirsch | 239/63 |
| 4,431,338 | 2/1984 | Hornabrook | 405/37 |
| 4,626,984 | 8/1984 | Unruh et al. | 364/132 |
| 4,691,341 | 9/1987 | Knoble | 379/97 |

Primary Examiner—James L. Dwyer
Attorney, Agent, or Firm—Townsend and Townsend

[57] ABSTRACT

The invention permits modification of the operation of irrigation controllers at a plurality of sites without investment in any additional equipment except for one paging receiver per site.

9 Claims, 6 Drawing Sheets

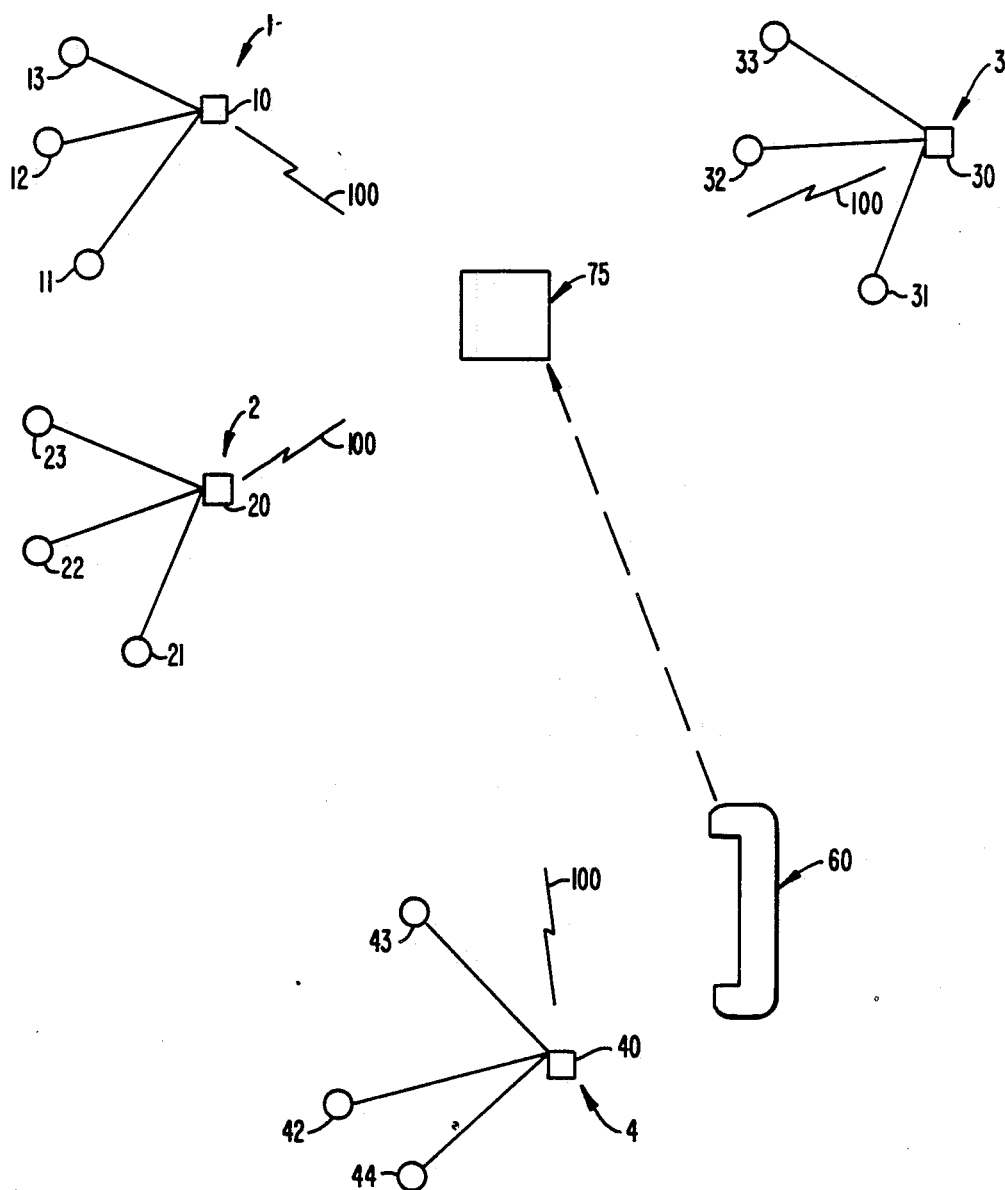
FIG._1.

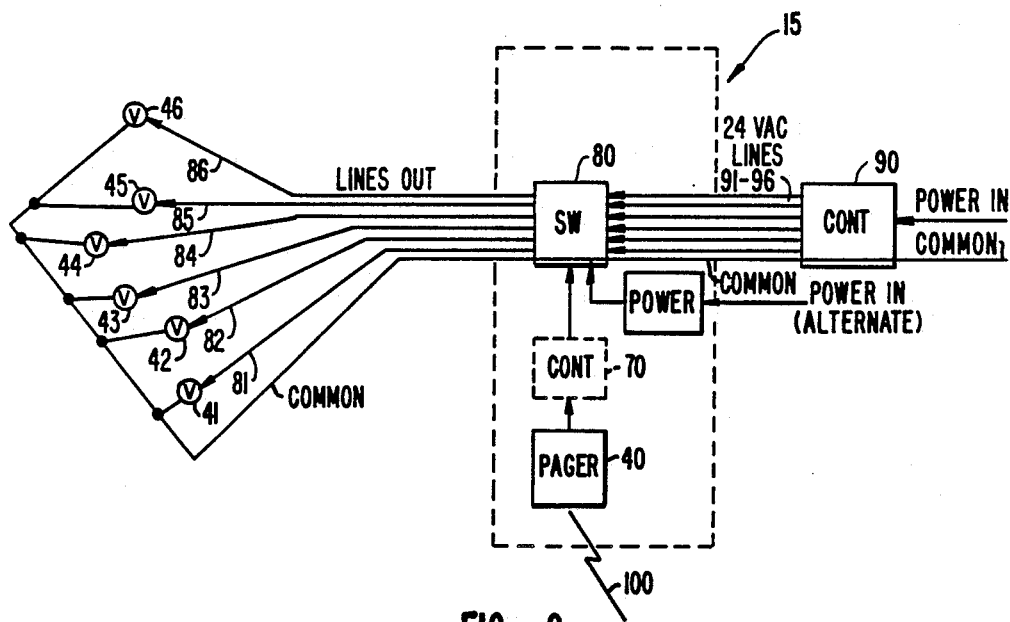
FIG._2.
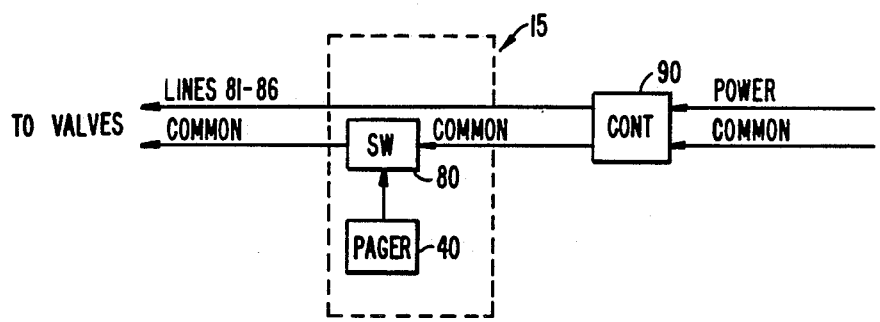
FIG._2a.
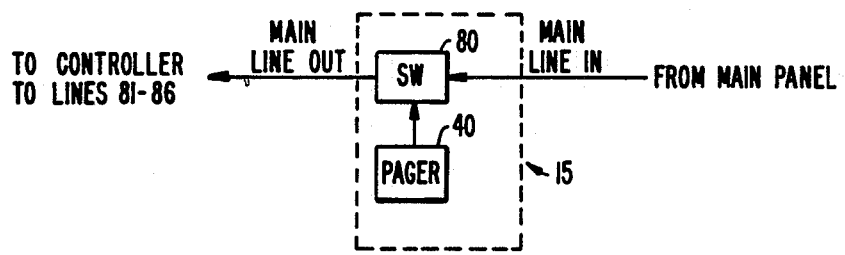
FIG._2b.

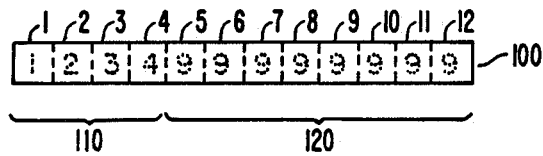
FIG._3.
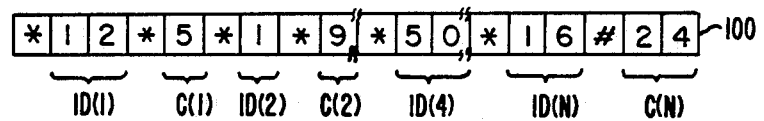
FIG._3A.
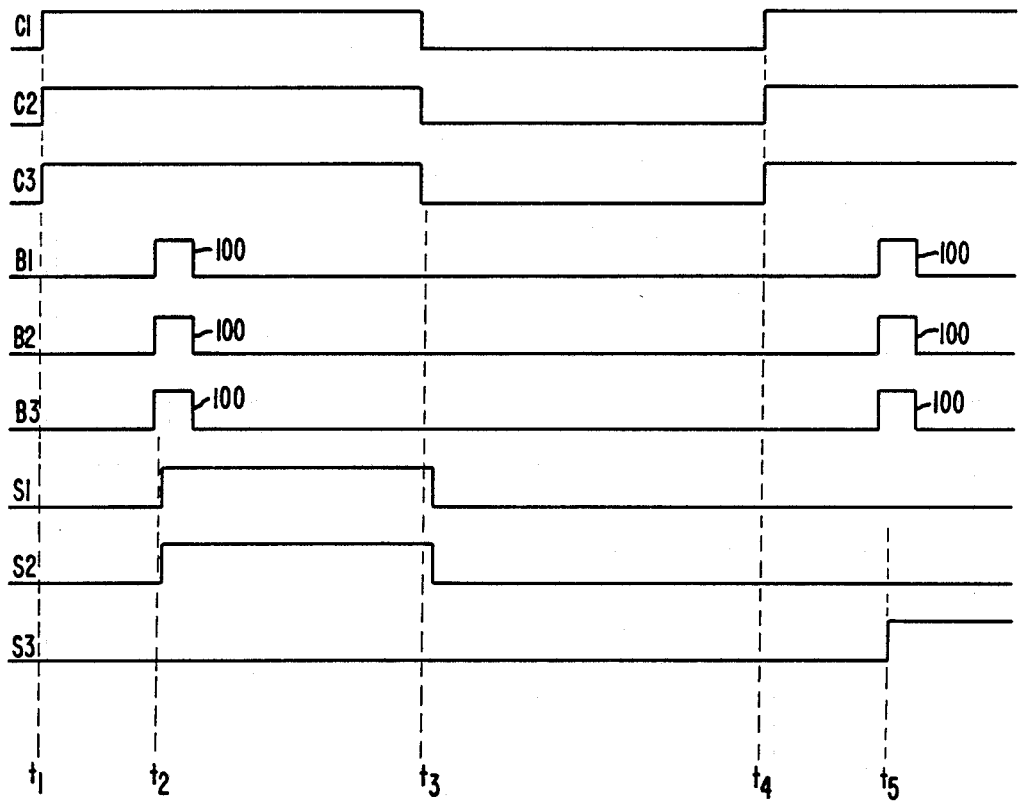
FIG._4.

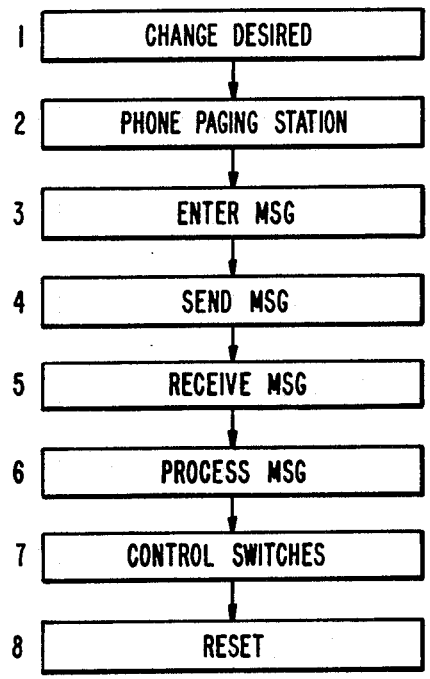
FIG._5.
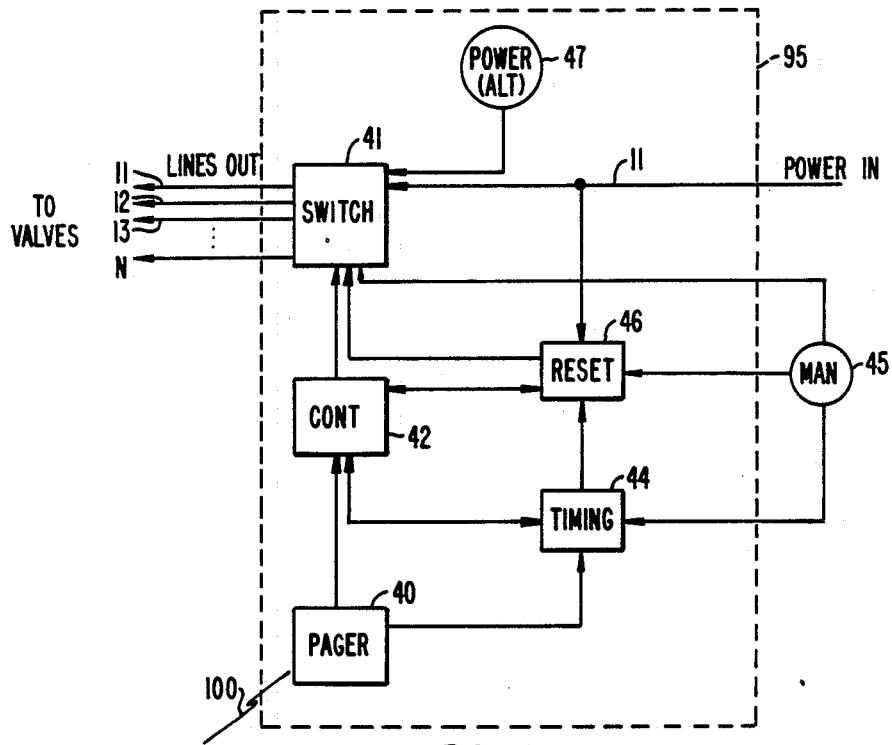
FIG._6.

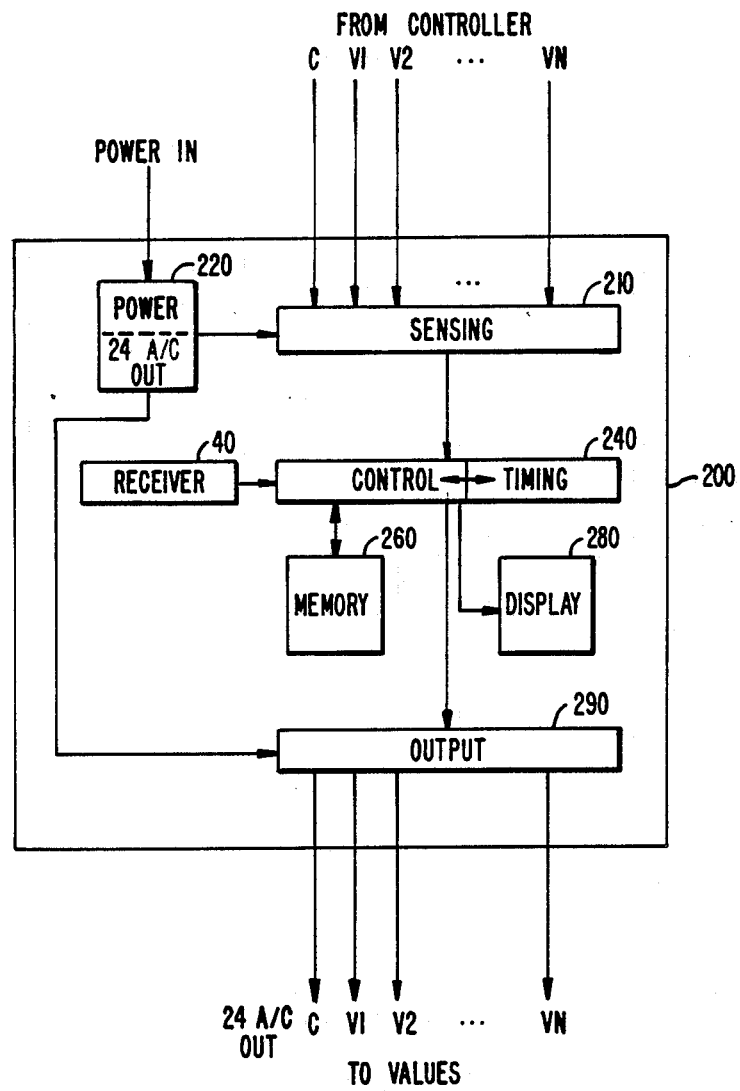
FIG._7.

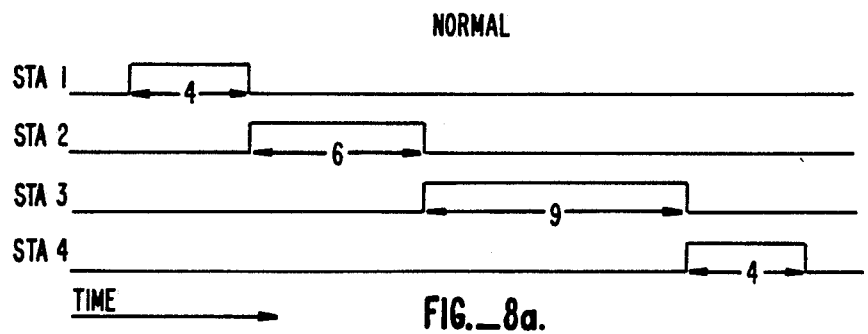
FIG._8a.
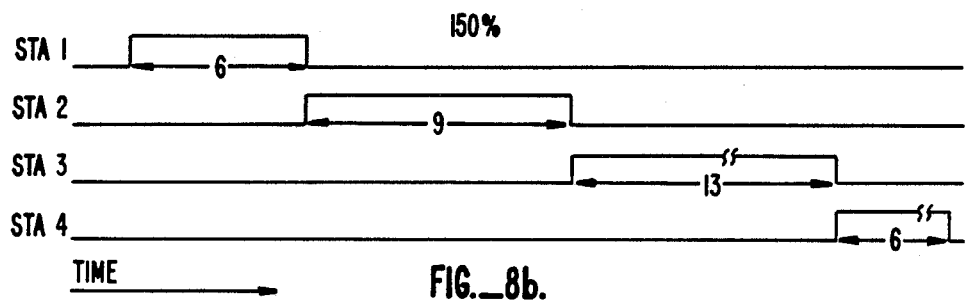
FIG._8b.
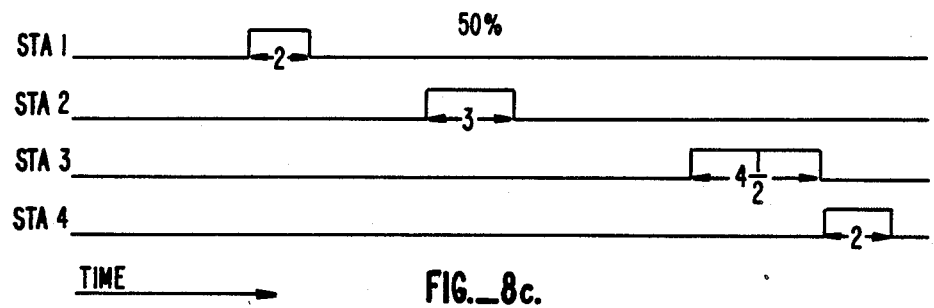
FIG._8c.

ELECTRONIC CONTROLLER FOR SPRINKLER SYSTEMS

BACKGROUND OF THE INVENTION

The use of electrical and hydraulic controllers as a means for selective control of valves in large irrigation systems is widespread. Such controllers have been employed in large real estate development projects, golf courses, municipal projects, isolated sites, and other applications as is well known in the art. Typically, such irrigation systems are generally known to include a source of water, a valving network or system with associated pipes, and a controller, the controller being designed to selectively open and close valves so that water can be communicated to various outlets for a known period of time. Such controllers may either be electronic and coupled to solenoid valves or fluid actuated and connected to corresponding formed valves. Such controllers will invariably include a manually settable timing or measuring mechanism to enable irrigation on a programmed or preplanned basis.

Inasmuch as irrigation systems invariably experience failures or conditions at the site of irrigation otherwise change. numerous attempts have been made to address the problem of modifying the normal irrigation pattern in the presence of such changed conditions. In many cases, however, actual irrigation will be at a location which is remote from the person who is concerned with monitoring or operating the site.

Several alternatives exist for altering the normal irrigation pattern as preset on the controller from varying locations, but these have proven to be beset by a number of problems. Manual adjustment of such controllers in response to changed conditions has proven to be very time consuming, labor intensive, and generally too slow. It is also possible to have direct lines of communication to such sites, such as with direct telephone line modems. HOwever, this approach is very expensive and requires a separate dedicated phone line to every location where a plurality of irrigation sites are involved. Moreover, even a telephone lessee in this situation must dial every individual location separately, which is time consuming and costly.

It is also possible to communicate with such controllers through a radio link; however, it has proven difficult to obtain necessary radio licenses because of the large number of regulations and procedures that must be complied with and because of the ever-increasing proliferation of radio users. Further, transmit antennas and receivers are large and expensive. Moreover, with a traditional radio system, a problem of having ample communication power arises. For example, a 14 foot antenna might be necessary in many applications, and for one individual to own a transmitter and receiver having adequate geographical coverage capabilities is very uneconomical and inefficient. In addition, a traditional radio controller irrigation system can only reach areas covered by the transmitter.

The prior art reveals a number of approaches for communicating with an irrigation site during changed irrigation conditions, but these approaches have either been unduly expensive, have met with limited success, or are impractical for dealing with a large plurality of remote locations. For example, U.S. Pat. No. 4,185,650 describes a method and apparatus for trouble-shooting an irrigation system. This patent discloses a receiver electrically connected to a controller at a position between the timing apparatus and a station advance mechanism. However, in this system, the radio receiver is responsive to two transmitted signals, and the transmitter is located at the site of trouble.

U.S. Pat. No. 4,146,049 describes a traveling sprinkler radio controlled mechanism warning device and is directed to a mechanism for preventing over-watering by unattended traveling sprinklers. In this system, a radio transmitter and receiver means are used to transmit and receive a shut-off signal for a pump supplying water to the traveling sprinkler in the event that the sprinkler stops. The transmitter in this system, however, is located at the sprinkler and the receiver is at the pump. The transmitter is actually carried in this system by a traveling sprinkler.

Another system in U.S. Pat. No. 4,396,149 discloses an irrigation control system wherein moisture sensors are included in masts sunk in the ground. The masts at the site transmit soil moisture and weather data to a central computer. U.S. Pat. No. 4,209.131 also describes a computer-controlled irrigation system, wherein a central station and a plurality of remote field stations are involved. A computer in that system, via a communication path such as a radio channel, sends coded command messages to selected remote stations for activating valves and pumps for delivering pre-established quantities of water to selected fields. However,. this system requires the use of special computers and special programming machines, and also transmitting means appear to be required at the actual irrigation site. In addition, expensive computing and communication means must be separately acquired and used in connection with this technique.

Another system, disclosed in U.S. Pat. No. 4,626,984, teaches a remote computer system for controlling a plurality of irrigation systems, each system having a local controller including an intelligent remote unit, each intelligent remote unit having a computer with a stored program for independently operating the local controller. However, in this system, the controller must possess means to monitor and control parameters in order to operate properly.

U.S. Pat. No. 3,726,477 discloses an automated irrigation control system which uses a central transmitter to transmit coded citizen band radio signals to a plurality of stations. However, the radio transmitting means has elaborate encoding features and appears to be limited to local control of the stations. Further. for this system, each receiver has its own frequency, a limited number of channels are available, transmission is noisy and insecure, and the geographical coverage is minimal.

In summary, the existing approaches for modifying the behavior of a controller at an irrigation site involved complicated communication and computational systems and also entail significant additional communications and computational costs to the users and operators of such systems. Most of these systems do not permit control by a remote operator or transmitter for added convenience.

What is needed, therefore, is a simple mechanism by which irrigation control at a site can be modified with a minimum of communications and computer equipment, minimum of capital investment costs, and maximum of convenience to the user. It is also desirable that an inexpensive, non-capital intensive technique be found whereby the operation of an irrigation controller can be modified by a user or transmitter at a remote location. It is also desirable that a system be proved whereby a plurality of controllers can be modified by essentially using a simple system and a common communications signal, unhampered by geographical limitations on the irrigation site, the transmitter, or the location of the user.

SUMMARY OF THE INVENTION

The invention comprises in summary a method for remotely controlling irrigation at one or more sites. The method includes the steps of phoning a commercial radio paging station to generate a radio paging signal for transmission to a site. Afterward, the paging signal is transmitted to the site, is received at the site, and is used to control irrigation at the site.

The invention also consists of a new controller for controlling irrigation at a remote site. The controller is useful in a system which includes a paging system having a paging station and a phone for communicating with the paging station. The paging station generates a signal for transmission to the controller, and the controller has means for receiving the paging signal and means for using the paging signal to control irrigation at the site. The controller may also include a microprocessor which decodes the contents of the paging signal. In most embodiments disclosed, the paging signal comprises a single multi-character phone message.

The invention permits modification of the irrigation pattern at a plurality of sites without investment in any additional equipment except for one paging receiver per site.

BRIEF DESCRIPTION OF THE DRAWINGS

The advantages of the invention over the art will become additionally appreciated by reference to the drawings and the; following description of the preferred embodiments.

FIG. 1 shows a functional block diagram of a control system in accordance with the invention showing a telephone in communication with a paging station which communicates with a plurality of paging receivers ("pagers") located at a plurality of irrigation sites;

FIGS. 2, 2a, and 2b are block diagrams of the invention showing a pager and switch connected to a conventional controller for controlling water flow to a plurality of valves.

FIGS. 3-3A are is a depiction of a paging signal in accordance with the invention showing a multi-character phone message;

FIG. 4 is a timing diagram of normal controller signals, received paging signals and switching signals:

FIG. 5 is a flow diagram showing the various steps in the method according to the invention;

FIG. 6 is another embodiment of an integrated controller in accordance with the invention;

FIG. 7 is another embodiment of the invention as an adapter for an existing controller;

FIG. 8a-8c are timing diagram illustrating the operation of the adapter shown in FIG. 7.

DESCRIPTION OF THE PREFERRED EMBODIMENT

Refer now to FIG. 1. Shown in FIG. 1 is a phone 60, a paging station 75, and a plurality of irrigation sites 1, 2, 3, and 4. Shown at each irrigation site are the following: controllers 10, 20, 30 and 40, and valves 11, 12 13; 21. 22, 23; 31, 32, 33; and 41, 42, and 43. Also shown in FIG. 1 is paging signal 100, which is transmitted from paging station 75 to each of the plurality of irrigation sites 1, 2, 3 and 4. In actual use, a user or operator at a location remote from an irrigation site might observe on the television or on the radio or might determine by interrogating a weather station, information pertinent to irrigation conditions at any one of the plurality of irrigation sites. The user, would pick up phone 60 and dial into paging station 75 using normal phones, paging procedures, and paging communications equipment. Paging, as used herein, includes any wide area public or private radio message transmission service. No additional equipment need be purchased at this point by the user, and phone 60 could be, for example, a car telephone or a standard house telephone. User at phone 60 then, would call paging station 75. Paging station 75 would interrogate the user calling from phone 60, who would identify himself by a paging I.D. number, and then proceed to place a paging message with paging station 75. Paging station 75 would then retransmit the paging message as a paging signal 100. Paging signal 100 would thus be transmitted to each of the plurality of irrigation sites 1, 2. 3 and 4. As will be further discussed, the paging signal normally consists of a multi-character message of, for example, 12 characters. A slightly modified commercially available paging receiver (pager) or equivalent circuit would be coupled to a controller at each of irrigation sites 1, 2, 3 and 4, and once the paging signal is received at each of these sites, the paging signal would cause alteration of the normal operation of the controllers at either sites 1, 2, 3 or 4 or any combination of the sites depending on which site has had a change in irrigation conditions. The normal amount of watering by valves 11, 12, 13; 21, 22 23; 31, 32 33; and 41, 42, and 43 would thereby be selectively altered depending on whether or not operation of the controller at that particular irrigation site had been altered in response to the received paging signal.

Several embodiments of the invention are depicted in the drawings. In the embodiments shown in FIGS. 2, 2a, 2b and 7, the paging receiver and a switching circuit would be coupled essentially as an adapter box to an existing controller or other switching circuit. In another embodiment as shown in FIG. 6, an integrated paging receiver, controller, and switching mechanism could be built as one integral unit.

Refer now to FIG. 2. FIG. 2 is a block diagram showing a controller adapter 15 which includes a paging receiver 40 and switching means 80. The adapter controls power to a plurality of valves 41, 42, 43, 44, 45 and 46 connected by power wires 81-86 to switching means 80. Also shown in FIG. 2 is a paging signal 100. The configuration shown in FIG. 2 is for illustration only and it should be understood that the paging receiver, the switch, the power wires, and controller may be coupled in a number of ways within the scope of the invention. In the embodiment shown in FIG. 2, existing irrigation controller 90 has an input power line coupled to its input and a plurality of power wires 91, 92, 93, 94, 95, and 96 coupled to its output. Power lines 91-96 from controller 90 are coupled to the input of switching mechanism 80, which has coupled to its output wires 81, 82, 83, 84, 85 going to valves 41, 42, 43, 44, 45 and 46, respectively. The paging receiver 40 is also coupled to switch 80 through control circuit 70 which could be a microprocessor, ROM, or decoder, for example. When a paging signal is received at paging receiver 40, the switch 80 will be caused to selectively open by control circuit 70. As another example, as shown in FIG. 2a, only the common wire from controller 90 is coupled to switching mechanism 80 and the power lines could bypass switch 80. In addition, control circuit 70 could be omitted and switch 80 could thereby be responsive to the mere presence or absence of paging signal 100. For the embodiment shown in FIG. 2a, upon receipt of a paging signal at receiver 40, switch 80 would be activated to open the common wire which would disable the complete electric current flow to valves 41, 42, 43, 44, 45 and 46. Switch 80 could also have a reset mechanism (not shown) that would allow switch 80 to automatically close after a predetermined period of time after responding to paging signal 100.

The controller used in accordance with the embodiment in FIG. 2 or 2a is a typical controller such as one manufactured by the Rain-Bird Company under Model No. RC-1260 or CIC-12. The paging receivers (pagers) used in FIGS. 2, 2a, and 2b could be conventional commercially available paging receivers manufactured. for example, by the Motorola Corporation, or a pager fabricated to receive a radio paging signal from a commercial radio paging system.

Referring again to FIG. 2, it can be seen that the plurality of wires 81-86, feeding valves 41, 42, 43, 44 45 and 46 are each coupled to a separate switch in switching means 80, whereby upon receipt of paging signal 100, wiring to selected valves could be opened and/or closed according to information in the paging signal or according to some predetermined routine. In FIG. 2, a common wire is coupled from controller 90 through adapter 15 without being switched by switch 80.

In the embodiment shown in FIGS. 2 and 2a, after a predetermined period, switch 80 would close and controller 90 would resume its normal control over irrigation valves 41, 42, 43, 44, 45 and 46. In a more complicated embodiment, receiver 40 could be coupled to a microprocessor control circuit 70. Microprocessor 70 would be designed to decode the paging signal received by paging receiver 40 and to then selectively cause changes to the operation of switch 80.

The operation of the embodiment shown in FIGS. 2 and 2a can be appreciated by way of illustration. In normal operation, controller 90 would cause watering for predetermined periods at irrigation sites as is well known in the art. Assume that a particular site has experienced a very dry environmental condition, such that additional watering, above normal watering caused by controller 90 is desired at the site. In accordance with the invention, an operator at a phone location could pick up his phone (e.g., at home or in his automobile). and call a paging station. The paging station would thereby interrogate the caller, who would enter an identification code and then a message. The message could be for example, a seven-digit number or any combination of alphanumeric characters permitted by the paging system. The message would include information that would in essence cause a microprocessor, decoder, or other control circuit to interpret the circuit information as requiring additional watering. For example, seven digits, all "9's". could indicate a prolonged watering response. The seven-digit message 100 then would be sent via paging signal 100 to the irrigation site, whereby the message would be received by the paging receivers 40 coupled to controllers at the site. Each paging receiver would transfer the seven-digit number to its microprocessor or other control circuit. The microprocessor would then determine by virtue of the 9 s in the digits that a prolonged watering response was required. It could be predetermined that "all 9's' represents a requirement to water for nine times the normal predetermined watering period. Other variations, combinations, and responses are obviously possible.

Assume as a second example, that an extreme wet condition has occurred so that it is no longer desirable for the controller to cause watering at the irrigation site. In the latter case, the operator at the phone could call up the paging station and, after interrogation, enter a message that could include a seven-digit number from 0 to 6. Upon receipt of the seven-digit signal "0123456" the microprocessor would cause watering at the "0" level for a first period, the "1" level for a second period, the "2" level for a third period, and thereafter would cause increased watering for predetermined periods as indicated by the digits in the phone message. In such a case, where an extended watering response is required, and where the invention is in the nature of an adapter box as shown in FIGS. 2 and 2b, the power wires could be coupled directly into the switching mechanism in parallel with the controller so that the controller operation could effectively be extended when over-watering is needed. Power could also be independently acquired from a source other than the controller output. Thus, during periods when the controller is normally inoperative, switch 80 could independently provide power in response to paging signal 100. The paging signal could also be used to activate backup valves or sprinklers, if desired.

In another simple embodiment as shown in FIG. 2b, adapter 15 includes a pager 40 coupled to switch 80. Switch 80 is electrically coupled ahead of controllers 10, 20, 30 and 40 in FIG. 2b, and has the main electrical power wire coupled to its input and the main wire(or wires) to site controllers coupled to its output. Switch 80 may be a separate switch or a slightly modified existing master switch. When pager 40 receives a paging signal 100, switch 80 opens and remains open for a predetermined period until it automatically resets or until a "close" paging signal is received by pager 40. Close signal 100 could be in this case an all zero message signal or an all "non 0" message signal. The embodiment shown in FIG. 2b would be very useful where a continuous rainy condition occurs at a plurality of sites so that it would be desirable to essentially shut down operation of all controllers at a number of rainy sites for a prolonged period of time.

Refer now to FIG. 3. Shown in FIG. 3 is a paging signal, in this case, a twelve-digit paging signal 100, and sub-signal portions 110 and 120. Subportion 110 includes the first four signal digits and would normally carry identification information. Digits 5-12 would comprise control information in the paging signal 100. Numerous variations in the use of the bits in paging signal 100 are obviously possible without varying from the scope of the invention. It should be understood that each paging receiver at each of the plurality of controllers at the irrigation sites can be configured to receive the paging signal 100. It is possible to construct the invention such that all the switches will be opened upon receipt of the paging signal, in which case, the paging receiver and switch would act as a mere on/off switch. However, the invention can also be so designed that only selected receivers will be activated depending on the identification and control bits in the paging signal.

Other advantages and benefits of the bit arrangement features of the invention can be seen by taking another illustration of a commonly occurring condition. Assume, for example, that the paging system is coupled to one hundred scattered irrigation sites over a wide geographical area. In many applications, paging signals are piggybacked on an FM carrier signal, and thereby achieve the same broadcast range as the basic FM carrier station. In this case, a local FM station would effectively broadcast the paging signal (i.e. message) to the plurality of scattered sites 1-100. Further assume that the irrigation sites have been carved up into four irrigation quadrants. In such a situation, the identification bits of the paging signal can be used to identify the irrigation quadrants subject to changed irrigation conditions. The latter bits of the paging signal could be used effectively as command bits. For example, assume a twelve-digit signal as shown in FIG. 3 and 100 sites. Each of the four quadrants would have 25 sites each. The identification digits "1-4" could be used for identification of the quadrant and/or valves to be controlled. Using this approach, "1-4" could be placed in the first digit, corresponding to the target quadrant, and digits "2-4" could be used to identify the controllers whose operation is to be modified. Alternatively, the first four digits could be used as identification digits, wherein the occurrence of either a 1, 2, 3, or 4 in the first four digits would indicate that switches in those quadrants indicated are to be activated. Where only one quadrant is identified per paging signal, it would be required that a plurality of quadrants, in which case the remaining digits could be used for very detailed control information by the microprocessor. On the other hand, it would be possible to use nine digits as identification digits, and the three remaining digits could be used for limited control information. Thus, in the latter approach, it is possible by using one signal to selectively control a plurality of controllers at a large number of irrigation sites. Thus, it can be seen that by using one control signal and by dividing the irrigation sites into sections, one control signal or one phone call can be used to control irrigation at a large number of sites.

An alternative message 100 is shown in FIG. 3a. The asterisks in the 18 character message 100 separate successively alternating identification characters and control characters. Thus, the message in FIG. 3a requires site 12 to water at 50% normal; site 1 to water at 90% of normal, and site 16 to water at 240% of normal.

It can also be seen that by using the invention as described in the drawings and in the foregoing discussion, one phone at an undetermined location using a minimum of air time can control a large plurality of dispersed irrigation sites, having obvious economical results. It can also be seen that the mechanism for use of the paging signal can vary from a simple on/off operation to a more elaborate mechanism using a microprocessor or other control circuit such as a decoder or a ROM.

In FIG. 2, the pager receiver to be used could be any of the commercially available pagers used in "radio paging." In many cases, these commercially available pagers permit message signals up to a 120 characters. Pagers to be used would include not only pagers operating from a paging station, but also pager/receivers that operate using an FM band subcarrier. In the latter case, an operator can take advantage of emerging nationwide paging networks. These systems operate by leasing time on numerous radio stations throughout the nation. Thus, a user could be in New York, call a central paging number, and have a paging message transmitted to irrigation sites, say in California. On the other hand, a user could be in California, call a central paging number and have paging signals sent through various radio stations all over the country to a plurality of selected irrigation sites, say in Florida, Georgia, and New York. In the latter instance, the pager scans the FM radio band and will lock onto a channel once it is determined that a paging signal is being transmitted by that particular FM channel.

Refer now to FIG. 4. FIG. 4 is a timing diagram showing normal controller signals C1, C2, C3, paging signals B1, B2, B3 and switching signals S1, S2, S3. In FIG. 4, C1, C2, and C3 represent the undisturbed, unmodified controller signals at separate irrigation sites 1, 2 and 3. At time T1 shown in FIG. 4. controller C1, C2, and C3 will activate and start a normal irrigation cycle, which will normally end as shown in FIG. 4 at time T3 and recycle on again at time T4. Assume further as shown in FIG. 4 that rain occurs at locations 1 and 2, and that the rainy conditions are made known to the user. The user can thereby phone a paging station, causing a paging signal to be sent to all three stations at time T2. Accordingly, paging signal B1. B2 and B3 would be received at sites 1, 2 and 3 at a time approximately equal to T2. The contents of the paging signal will indicate that controllers at sites 1 and 2 should be deactivated for the duration of the normal irrigation period via the switches coupled thereto. Processors coupled to the receivers would use the contents of the paging signals to generate switching signals S1 and S2. The duration for signals S1 and S2 are controlled by a simple clock coupled to the processor or could be controlled by the status of controller signals C1 and C2. Accordingly, a short time after T2, switching signals S1 and S2 at sites 1 and 2 will cause controllers at 1 and 2 to be deactivated by causing their respective switches to open, thereby inactivating the controllers at sites 1 and 2. Irrigation at sites 1 and 2 will therefore be inactivated for the duration of the normal watering period at sites 1 and 2. Irrigation at site 3 will continue as normal inasmuch as the paging signal will have included no information causing alteration of irrigation at site 3 even though the paging signal may have been received at site 3. At the end of the normal watering period for sites 1, 2 and 3. i.e. at time T3, the switches for sites 1 and 2 would be reset (i.e. would close), causing the controllers to resume their normal control over irrigation at these sites. Reset of the switches could be accomplished by using the change in the control signal from "1" to "0" to cause the switch to reset from open to close. Alternatively, the switches could be reset by a signal from an internal clock, or by reset information included in the paging signal. Thereafter, at time T4, normal irrigation at sites C1, C2, and C3 would resume and switching signals S1, S2 and S3 would all be in the "off" condition at time T4.

Assume further, that at time T5, a rainy condition is observed at site 3. At that time, a new paging signal could be sent from the paging station to sites 1, 2 and 3, but the contents of the paging signal would only cause deactivation of the controller at site 3. Shortly after time T5, switching signal S3 at site 3 would to to "1", and irrigation at that site would be deactivated for the duration of the normal watering period. The inactivate and reset cycle would repeat as previously discussed for sites 1 and 2. Variations from the foregoing and more complicated scenarios can be constructed without varying or altering the scope of the invention.

Refer now to FIG. 5. FIG. 5 is a block diagram showing the steps for the method in accordance with the invention. Step 1 indicates that a change in the normal irrigation pattern is desired due to, for example, observation of weather information or other pertinent information pertaining to one of the sites to be controlled, or perhaps for irrigation test purposes. In step 2, a user will phone a central station with an I.D. number that will identify the user as one permitted to use the paging system. No special equipment would be required for this step, and the user would use normal, commercially available paging systems. Next, step 3, the user or the caller would then enter the message which would be a multi-character message to cause the desired irrigation pattern at desired irrigation sites. The station in the next step 4 would then send the phone number/message to the sites within its jurisdiction. The same message could be sent to all pagers within a jurisdiction, which could be of national or international geographical scope depending on the paging system. In step 5, the message would be received by the pagers at the various locations. In step 6, the received message would be processed at the location. In step 7, the process information would be used to control the switch, either through a simple on/off action at selective sites or through selectively controlling switches at selected sites. Following the desired control scenario, the switches would be reset, step 8, either automatically, or upon receipt of a resetting phone message.

Refer now to FIG. 6. Shown in FIG. 6 is an integrated controller/switch/pager receiver 90 in accordance with one embodiment of the invention using conventional components. Shown in FIG. 6 is a controller 95 including a pager/receiver 40, a control circuit 42, a timing circuit (clock) 44, manual control 45, reset 46, and a switch 41. Also shown in FIG. 6 is line 14 coupled to the input of switch 41 and outgoing power lines 11, 12, 13, etc., through line N, which are coupled to the output of switch 41. An alternate power source 47, such as a battery, solar, etc. is also shown coupled to another input of switch 44. Also shown in FIG. 6 is paging message 100. In operation, the integrated controller/receiver of FIG. 6 would operate as follows. During normal operation, pager controller 95 would cause irrigation at predetermined periods as could be set by manual control 45. Upon occurrence of a changed irrigation condition. a paging message would be received at receiver 40 in the integrated receiver/controller 95. The paging signal received at receiver 40 would then be transferred to control circuit 42 for decoding. Depending on the characters in the message, control circuit 42 would activate switch 41 to cause opening or closing of lines 11, 12, 13, etc. A clock 44 would be used to control the timing of the opening or closing of lines 11, 12 and 13. Reset 45 is used to reset the operation of switch 41 in response to instructions from microprocessor 42, a change in status of power line 13, a manual control 45 or time information from clock 44. In normal operation, switch 41 would open and close on the basis of a regularly programmed watering cycle that could be contained in a microprocessor or could be controlled by manual control 45 and clock 44. When paging signal 100 is received and decoded, the normal irrigation cycle would be disrupted based on the contents of the paging signal as previously described. The components of integrated controller 90 could be fabricated using conventional microchip fabrication technology. further reducing the size and the cost compared to conventional controllers.

Refer now to FIG. 7 which shows an adapter 200 for curtailing or prolonging the operation of an existing controller by a certain percentage factor. The percentage modification would be received in receiver 40 via a paging message. The sensing circuit 210 would sense the normal period of activation of lines V1–Vn from a controller (not shown) and couple sensed signals to the control circuit 240. Where the percentage modification exceeds 100%. control circuit 240 causes output switch 290 to immediately couple power from power source 220 to output lines V1–Vn to the valves. By measuring the duration of the sensing signals from sensing circuit 210, the normal irrigation period is determined. Control circuit 290 then cause the output switch to remain closed for the required additional period to meet the percentage indicated. If the percentage modification is less than 100%. the control circuit would be configured to not initiate irrigation until the sensing signals return to an inactive state. Afterwards, output switch 290 would provide power from source 220 for the shortened period of time.

FIG. 8 is a timing diagram showing normal (100%), 150%, and 50% watering at 4 irrigation sites or stations using the invention according to the embodiment in FIG. 7.

The foregoing embodiments have been intended to be illustrative only and do not limit the invention. Accordingly, other modifications, uses, and embodiments can be devised by those skilled in the art without departing from the spirit and scope of the present invention since the invention is limited only by the appended claims.

I claim:

1. A process of controlling a sprinkler system having connection for controlled irrigation and being within the service area of an existing telephone paging network;

said existing telephone paging network consisting of telephones connected via telephone lines to a paging station, said paging station having the capability of transmitting addressing and messaging signals to individual pager subscribers via a discrete radio digital signal upon request of a caller from one of said telephones;

said sprinkler system having at least one sprinkler, water supply and valve means located in a conduit between said water supply and said sprinkler for the controlled flow of water from said water supply through said valve means and to said sprinkler for controlled irrigation;

said sprinkler system including at least one sprinkler controller, said sprinkler controller including means for operating said valve means on said sprinkler system, an input for sprinkler control digital information, and means for translating said sprinkler control digital information into operation of said valve means;

said sprinkler system including at least one of said pagers, said controlling process comprising the steps of:

calling said existing telephone paging network from one of said telephones through one of said telephone lines to provide addressing and messaging signals to said network;

after said calling step, transmitting said addressing and messaging signals from said telephone paging network to said pager;

communicating from said pager to said sprinkler controller upon receipt of said addressing and messaging signal, sprinkler control digital information for controlling the flow of water through said sprinkler.

2. The process of claim 1 wherein said valve means includes a plurality of valves each said valve having control over at least one sprinkler;

said sprinkler controller includes a plurality of outputs for controlling said plurality of valves.

3. The process of claim 1 wherein said sprinkler controller further includes:

a clock;

clock gating means for gating timed signals from said clock to said valve for opening and closing said valve;

means between said gating means and said valve for adjusting the gated time signals in duration between said clock and said valve, responsive to digital sprinkler control information; and wherein said step of transmitting includes sending digital sprinkler control information for altering the duration of said time gated signals between said clock and said valve whereby said duration of flow of water through said sprinkler means is responsive to said digital sprinkler control information.

4. Apparatus for controlling a sprinkler system being within the service area of an existing telephone paging network, wherein said existing telephone paging network consists of telephones connected via phone lines to a paging station, said paging station having the capability of transmitting addressing and messaging signals to individual pager subscribers via a discrete radio digital signal upon request of a caller from one of said telephones; said system comprising:

a sprinkler system, said sprinkler system having at least one sprinkler, a water supply, and valve means located in a conduit between said water supply and said sprinkler for the controlled flow of water from said water supply through said valve means and to said sprinkler for controlled irrigation;

at least one sprinkler controller, said sprinkler controller including means for operating said valve means on said sprinkler system, an input for sprinkler control digital information, and means for translating said sprinkler control digital information into operation of said valve means;

at least one of said pagers;

means for connecting said pager to said input of said sprinkler controller for sprinkler control digital information;

whereby at least one of said telephones being used to call said existing telephone paging network for discretely addressing and messaging said pager to connect said pager with said sprinkler and provide said sprinkler control digital information for the controller flow of water through said sprinkler.

5. The invention of claim 4 and wherein said sprinkler controller further includes:

a clock;

clock gating means for gating timed signals from said clock to said valve for opening and closing said valve;

line gating means between said clock and said valve, said line gating means for altering timed signals in duration between said clock and said valve responsive to digital sprinkler control information whereby the duration of operation of said sprinkler occurs responsive to said digital sprinkler control information.

6. The invention of claim 4 and wherein said sprinkler system includes a plurality of valves, each valve controlling the flow of water to at least one sprinkler;

said sprinkler controller has a plurality of outputs for correspondingly controlling at each output at least one of said valves.

7. In the combination of an existing commercial paging system and of a system for controlled irrigation, said paging system including at least one pager, said pager having means for being addressed by a discrete radio digital signal for addressing said pager and means for receiving and outputting a digital signal when said pager is discretely addressed by said discrete radio digital signal; a system for discretely addressing said pager and sending a digital signal to said pager when said pager is discretely addressed, said system including an input from a telephone line including a first input for said discrete address of said pager and a second input for said digital signal to be sent by said system when said pager is discretely addressed; the improvement in said paging system for discretely controlling a sprinkler system comprising:

a sprinkler system, said sprinkler system having at least one sprinkler, a water supply, and valve means located between said water supply and said sprinkler for the controlled flow of water from said water supply through said valve means and to said sprinkler for controlled irrigation;

at least one sprinkler controller, said sprinkler controller including means for operating said valve means on said sprinkler system, an input for sprinkler control digital information, and means for translating said sprinkler control digital information into timed operation of said valve means;

means for communicating between said pager and said sprinkler controller whereby said pager when discretely addressed can receive and input sprinkler controller digital information into said sprinkler controller for controlled irrigation through said valve to said sprinkler.

8. The invention of claim 7 and wherein: said sprinkler controller includes a clock;

clock gating means for gating time signals from said clock to said valve for opening and closing said valve;

and means between said gating means and said valve for altering the gated time signal in duration between said clock and valve responsive to digital sprinkler control information whereby said duration of flow of water through said valve to said sprinkler occurs responsive to digital sprinkler control information received at said controller.

9. The invention of claim 7 and wherein said sprinkler system includes a plurality of valves, each valve having control over at least one sprinkler; and, said sprinkler controller has a plurality of outputs for controlling a plurality of valves.

* * * * *